July 16, 1968   F. U. ZOLG ET AL   3,393,117

COPPER-CLAD GLASS REINFORCED THERMOSET RESIN PANEL

Filed Feb. 13, 1964

INVENTORS:
FRED U. ZOLG
VICTOR G. SOUKUP
BY
Curtis, Morris & Safford
ATTORNEYS.

United States Patent Office 3,393,117
Patented July 16, 1968

3,393,117
COPPER-CLAD GLASS REINFORCED
THERMOSET RESIN PANEL
Fred U. Zolg and Victor G. Soukup, Cincinnati, Ohio,
assignors to The Cincinnati Milling Machine Company,
Cincinnati, Ohio, a corporation of Ohio
Filed Feb. 13, 1964, Ser. No. 344,676
3 Claims. (Cl. 161—82)

ABSTRACT OF THE DISCLOSURE

Disclosed herein is a copper-clad plastic panel comprising a reinforced thermoset resin base comprising a plurality of spaced layers of woven glass cloth with a layer of matted glass fibers between each pair of glass cloth layers, all of said reinforcing layers being imbedded in said resin base.

---

Figure 1:
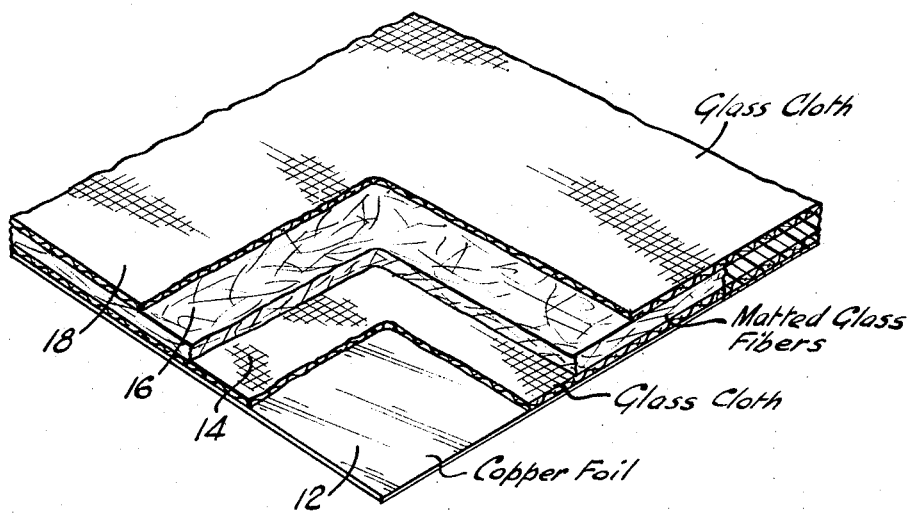

This invention relates to copper-clad plastic panels of the type that are used in the manufacture of printed circuits, and more particularly to a novel reinforcing of the plastic base of such panels and to the improved panels thereby obtained.

In the manufacture of printed circuits the starting material is usually a copper-clad plastic panel which comprises essentially a molded reinforced plastic sheet having a copper foil affixed to one or both sides thereof. The metal foil may be attached to the plastic base by a layer of adhesive, or in some cases satisfactory adherence of the foil can be achieved by molding the plastic directly to the foil. In order to be acceptable for printed circuit use, the copper-clad panels must meet a wide variety of electrical and physical specifications. Some of the more important of these specifications arise out of the fact that during manufacture of the printed circuit the panels are dipped in a bath of molten solder and must be capable of passing through this bath without damage, e.g., without warping or being otherwise physically deformed.

The nature of the reinforcement used in making the plastic base of the panel plays an important role in providing the panel with the desired strength and resistance to physical deformation, either in the solder bath or other steps in printed circuit manufacture or during use under varying temperature and humidity conditions. Conventionally the plastic base of the panel has been reinforced with a matted fibrous reinforcement, e.g., matted glass fibers. For example, a glass fiber mat is impregnated with resin in viscous liquid form, placed in contact with a copper foil, and the resulting assembly is molded under heat and pressure to produce a copper-clad panel.

While such glass mat reinforcements have been extensively used and provide a reasonably strong base, they are subject to a number of deficiencies that should desirably be overcome. Thus when the molded panel is flexed, there is a tendency for the mat fibers near an exposed surface of the plastic to erupt beyond the plastic surface. This tendency increases as the panel is bent to a smaller radius of curvature. Also because of the spacing between the fibers in the mat, the quantity of fibrous material that can be used in a panel of given dimensions is limited.

It is accordingly an object of the present invention to provide a copper-clad panel having a plastic base containing a novel reinforcing structure which is not subject to the deficiencies noted above. It is another object of the invention to provide a copper-clad reinforced plastic panel which can be bent to a relatively small radius without eruption of the reinforcing fibers from the surface thereof. It is still another object of the invention to provide a glass-reinforced copper-clad panel wherein the base has a relatively heavy loading of glass fiber reinforcement. It is still another object of the invention to provide a copper-clad panel having improved strength and resistance to deformation. It is a still further object of the invention to provide an improved method of making such a copper-clad panel. Other objects of the invention will be in part obvious and in part pointed out hereafter.

It has been found that the objects and advantages of the invention can be achieved by employing a laminar or "sandwich" type of reinforcement. In accordance with the invention a reinforcing structure is employed which comprises a plurality of spaced layers of woven glass cloth with a layer of matted glass fibers between each pair of glass cloth layers. With this construction the relatively loose fibers of the glass mat are confined within boundary layers of woven glass cloth, and hence the tendency of these loose fibers to erupt as the panel is flexed is eliminated. The composite structure retains the desirable porosity of the matted glass fibers and at the same time provides a dense, tight, glass reinforcement at the opposite boundary portions of the surfaces of the plastic base. Glass cloth layers, if used alone, have a tendency to slide laterally during the molding process. The matted glass interlayers tend to prevent such lateral displacement of the glass cloth layers during molding. Also, in cases where the resinous composition used to form the base of panel contains a filler, glass cloth tends to filter out the filler, thereby producing a non-uniform distribution of the filler in the base of the panel. This problem, which is especially acute in the case of relatively thick sections, can be largely avoided by using matted glass interlayers in accordance with the present invention. Moreover, the inherent symmetry of the present reinforcing structure tends to prevent warping of the panel.

Figure 2:
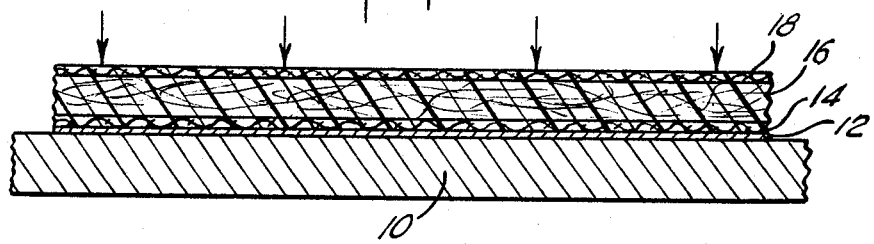

In order to point out more fully the nature of the present invention, reference will now be made to the accompanying drawing, which illustrates diagrammatically a copper-clad panel incorporating a preferred embodiment of the invention and wherein:

FIGURE 1 is a perspective view of the portion of a molded panel showing the several layers of which it is composed; and, FIGURE 2 is a transverse section through the panel also illustrating its laminar structure.

Referring to FIGURE 2, the various layers of which the panel is composed are initially assembled on a platen or caul 10 which can later be introduced into a mold as the lower molding surface thereof. The caul 10 may be a sheet of stainless steel with a highly polished upper surface. As the first step in assembling the panel, a copper foil 12 is laid on the upper surface of caul 10. If desired, a suitable conventional mold release agent may be interposed between the upper surface of caul 10 and the copper foil 12. A layer of woven glass cloth 14 is then placed on top of the copper foil and a quantity of a liquid viscous thermo-setting resin composition spread over the surface of the glass cloth. Thereafter a layer of matted glass fiber 16 and a second glass cloth layer 18 are placed on top of the liquid resin and pressed downwardly to cause the resin to permeate all three of the layers 14, 16 and 18.

The resulting assembly is transferred to a mold and molded at an elevated temperature and pressure under conventional molding conditions to produce a unitary structure. As shown in FIGURE 1, the finished molded panel comprises the copper foil 10 adherent to a plastic base having a sandwich reinforcement comprising a first layer of glass cloth 14 adjacent to the copper foil, a second layer of glass cloth 18 adjacent to the exposed surface of the base, and a glass mat 16 therebetween, all three reinforcing layers being imbedded in the molded plastic.

The section shown in the drawing comprising only two layers of glass cloth with an intervening layer of matted fibers is preferred, since it yields a relatively thin base which is usually desired for printed circuit work. However, it will be evident that if a thicker base is required, additional layers of reinforcement can be used. More particularly, any odd number of glass cloth layers can be used with a glass mat between each pair of glass cloth layers. The particular type of resin employed is not critical. Any of the liquid thermo-setting resins conventionally used for preparing the molded base of a printed circuit panel can be employed. Typical thermosetting resins for this application are the phenol-formaldehyde, ureaformaldehyde, epoxy and modified methacrylate resins.

The order of steps comprising the method of assembling the panel before molding may also be modified in certain respects. For example, the liquid resin may be spread on top of the copper foil and the sandwich reinforcement thereafter placed on the resin layer and pressed downwardly to cause the resin to impregnate the reinforcement. Alternatively, the glass cloth layer 14 and mat 16 may be placed on the copper foil and the resin spread over the glass mat layer before the layer of glass cloth 18 is assembled thereon.

From the foregoing description is should be apparent that the present invention provides a copper-clad panel capable of satisfying the objects recited above. The mat 16 with its relatively loosely packed and randomly arranged fibers tends to prevent lateral slippage of the two glass cloth layers with which it is in contact. At the same time the loose fibers of the mat 16 are spaced from the upper surface of the plastic by the relatively tight and thin structure of the glass cloth layer 18. Hence eruption of the loose fibers of the mat is prevented as the panel is flexed. Because of the symmetry of the reinforcing "sandwich" with the relatively tight, dense and strong reinforcing layers adjacent to the opposite surfaces of the plastic base, the panel structure is resistant to warping and other physical deformation.

It is of course to be understood that the foregoing description is intended to be illustrative only and that numerous changes can be made in the details described without departing from the spirit of the invention as described in the appended claims.

We claim:

1. A copper-clad plastic panel comprising a reinforced thermoset resin base molded to a copper foil, the reinforcement of said base comprising a plurality of spaced layers of woven glass cloth with a layer of matted glass fibers between each pair of glass cloth layers, all of said reinforcing layers being imbedded in said resin base.

2. A copper-clad plastic panel comprising a reinforced thermoset resin base and a copper foil bonded thereto, the reinforcement of said base comprising two spaced layers of woven glass cloth with a layer of matted glass fibers therebetween, all of said reinforcing layers being imbedded in said resin base.

3. A copper-clad plastic panel comprising a reinforced thermoset resin base and a copper foil bonded thereto, the reinforcement of said base comprising a first layer of woven glass cloth adjacent to said copper foil, a second layer of woven glass cloth adjacent to the exposed surface of said resin base, and a layer of matted glass fibers between said glass cloth layers, all of said reinforcing layers being imbedded in said resin base.

References Cited
UNITED STATES PATENTS

| | | | |
|---|---|---|---|
| 2,577,205 | 12/1951 | Meyer et al. | 161—93 X |
| 2,695,351 | 11/1954 | Beck | 201—64 |
| 2,955,974 | 10/1960 | Allen et al. | 161—93 |
| 3,149,021 | 9/1964 | Goepfert et al. | 161—214 |

ROBERT F. BURNETT, *Primary Examiner.*

ALEXANDER WYMAN, G. D. MORRIS, W. J. VAN BALEN, *Examiners.*